United States Patent [19]

Sicotte et al.

[11] Patent Number: 5,375,891
[45] Date of Patent: Dec. 27, 1994

[54] UNIVERSAL CONNECTOR FOR DOWNSPOUT DRAINAGE EXTENSIONS

[75] Inventors: Jean Sicotte; Denis Sicotte, both of Manitoba, Canada

[73] Assignee: Metro Eavestroughing Ltd., Winnipeg, Canada

[21] Appl. No.: 990,046

[22] Filed: Dec. 14, 1992

[51] Int. Cl.⁵ ............................................. F16L 27/00
[52] U.S. Cl. .................................. 285/176; 285/184; 285/183; 52/16; 137/615
[58] Field of Search ................. 52/11, 16; 137/615; 285/176, 184, 283, 177, 183, 424; 405/119, 120, 121, 122, 123

[56] References Cited

U.S. PATENT DOCUMENTS

| | | | |
|---|---|---|---|
| 455,910 | 7/1891 | Gordon | 285/183 |
| 2,975,805 | 3/1961 | Horn | 137/615 |
| 3,060,952 | 10/1962 | Bystrom | 52/16 |
| 3,316,928 | 5/1967 | Weakley | 137/615 |
| 3,861,419 | 1/1975 | Johnson | 137/615 |
| 3,904,121 | 9/1975 | Geagan | 405/120 |
| 3,911,954 | 10/1975 | Johnson | 137/615 |
| 4,135,540 | 11/1979 | Felsen | 137/615 |
| 4,270,572 | 6/1981 | Jarzynka | 52/16 |
| 4,641,464 | 2/1987 | Anderson | 52/16 |
| 4,798,028 | 1/1989 | Pinion | 52/16 |
| 5,014,745 | 5/1991 | Wait | 137/615 |

FOREIGN PATENT DOCUMENTS

| | | | |
|---|---|---|---|
| 1169224 | 6/1984 | Canada | 52/16 |
| 1188476 | 6/1985 | Canada | 52/16 |
| 2244420 | 4/1974 | Germany | 52/16 |
| 0010998 | of 1892 | United Kingdom | 285/177 |
| 2234285 | 1/1991 | United Kingdom | 52/16 |

*Primary Examiner*—Eric K. Nicholson
*Attorney, Agent, or Firm*—Bauer & Schaffer

[57] ABSTRACT

An adaptor for connecting industry standard eavestrough downspouts to drainage extensions of a similar or dissimilar cross section and allowing the extension to be pivoted vertically. Such an adaptor is shown with portions having two different cross sections, one capable of fitting outside several industry standard drainage extensions and having a hinge between the two portions. A mating Velcro TM loop-and-hook pair is installed on the drainage extension's outer end and at an appropriate place up the downspout. Thus, a downspout with a round, or squared, or rectangular cross section can be connected to an extension with any of these cross sections, making a total of nine permutations and more if minor bending or fitting of further sizes and shapes of downspouts or extensions is undertaken. In the preferred embodiment, the extension can thereafter be raised to a vertical position and separately fastened there.

1 Claim, 5 Drawing Sheets

UNIVERSAL CONNECTOR FOR DOWNSPOUT DRAINAGE EXTENSIONS

INTRODUCTION AND DESCRIPTION OF THE PRIOR ART

An irritating problem created inadvertently by the installation of eavestroughing is the drainage extension's need to be on a drainable surface, which usually means it projects several feet into an otherwise clear space of lawn. Not only does this impede the lawnmower, but more commonly and (perhaps) more seriously it causes the occasional tripping of an unsuspecting visitor.

Various devices have been introduced to allow the downpipe drainage extension to be moved out of the way; a number of these appear in the prior patent art. As described in Canadian Industrial Design No. 63054, and U.S. Pat. Nos. 3,861,419, 4,270,572, and 2,975,805, a hinging mechanism appears the simplest solution; other solutions are very inventive but more complex and therefore costly, such as U.S. Pat. Nos. 3,060,952 and 5,014,745 in which the extension is stored in a vertical position and only released to horizontal when water is flowing through the downspout. All of these solutions share one common limitation, which the inventor's offering overcomes: they are useful only when the extension is either unitary with the downspout or of an identical cross section.

The invention then resides in providing a universal hinged connector to connect dissimilarly cross sectioned downspouts and extensions, while still permitting the elevation of the downspout for lawnmowing or whatever purpose required. This is achieved by having a tube of approximately circular cross section, or more properly a square cross section with very rounded corners on the square, hinged with a second tube of approximately square cross section; more properly a square cross section with slightly rounded corners on the square. There are approximations of common forms for both downspouts and drainage extensions; and moreover, the hinged connector is provided with simple screws with instructions to apply them in appropriate configurations, so that either tube can be connected either on the exterior surface of a downspout or the interior of a drainage extension, as required. Thus the hinged connector fits at least the three different shapes of industry standard pipe dimensions which are 3" round, 2-⅜"×2-⅜" square, and 2"×3" rectangular (as are commonly used in Canada for residential, not commercial, applications), as well as being able to accommodate an unusually small downspout or unusually large extension simply by reversal of the connector. Finally, a screw-and-Velcro TM pair (loop and hook) are installed, one part on the outer end of the extension and the matching part on the upper portion of the downspout at an appropriate distance. So any of several extension cross sections can be fitted to an existing downspout, and simply lifted out of the way and Velcro TM-latched when required.

An object of the present invention is to provide a method of connecting an eavestrough downspout with a drainage extension pipe having either the same or a different cross section, by: (i) fabricating or obtaining a first portion of connector pipe having a cross section approximately identical to that of the downspout, but slightly larger; (ii) fabricating or obtaining a second portion of pipe having a cross section approximately identical to that of the drainage extension, but slightly smaller; (iii) fastening one end of the first portion to one end of the second portion so that water may flow through the two portions; (iv) connecting the other end of the first portion to the downspout by inserting the downspout inside the first portion and fastening the downspout and the first portion together by known means; and (v) connecting the other end of the second portion to the drainage extension by inserting the second portion inside the drainage extension and fastening the drainage extension and the second portion together by known means; so that water flows from the downspout through the two portions of pipe and into the drainage extension.

A further object of the invention is to provide for a device for allowing common industry standard downspout pipes with cross sections chosen from the group containing: round or almost round; square or almost square; rectangular or almost rectangular, to be connected to common industry standard extension pipes with cross sections chosen from the same group; and further for allowing the end of the extension away from the connection to be pivoted vertically and reversibly fastened to the downspout; the device comprising:

(a) a hinged connector, comprising (i) a first portion of connector pipe having a square, or almost square, cross section; the cross section being slightly larger than a standard industry downspout cross section chosen from the same group, or, where more than one size or shape of downspout cross section is in common use, larger than a series of the most common of such sizes or shapes, so that several sizes or shapes of the downspouts may fit inside the portion; (ii) a second portion of the connector pipe having a round, or almost round, cross section; the cross section being slightly smaller than a standard industry drainage extension cross section chosen from the same group, or, where more than one size or shape of drainage extension cross section is in common use, smaller than a series of the most common of such sizes or shapes, so that the second portion may fit inside several sizes or shapes of drainage extensions; (iii) flanges extending from the first portion, mating with flanges extending from the second portion, such that when the two the portions are oriented longitudinally and the flanges are mated, water will flow through the two portions without escaping between them; (iv) pivot pins through the flanges at right angles to the longitudinal axis of the two portions of pipe, allowing the two portions to hinge relative to one another so that if one of the portions remains horizontal the other will pivot vertically; (v) screws; so that when a downspout of cross section smaller than the first portion is fitted inside the first portion, it may be firmly affixed there with the screws, which are screwed through the first portion and the downspout from the exterior surface of the first portion; or if an extension pipe of cross section larger than the second portion is fitted outside the second portion, it may similarly be firmly affixed there with more of the screws; and (b) Velcro TM loop or hook material screwed or otherwise affixed to the end of the extension away from the connector; and mating Velcro TM material screwed or otherwise affixed to the downspout at an appropriate height so that when the extension

3 pipe is pivoted upwards it may be reversibly affixed to the downspout.

It is a further object to provide for such a device in which the series of different sizes and shapes of downspouts consists in: three-inch diameter round or approximately round; 2-⅜"×2-⅜" square or approximately square, and 2"×3" rectangular or approximately rectangular; and further, in which the series of drainage extensions consists in the same sizes and shapes.

DETAILED DESCRIPTION OF THE INVENTION

Figure 1:
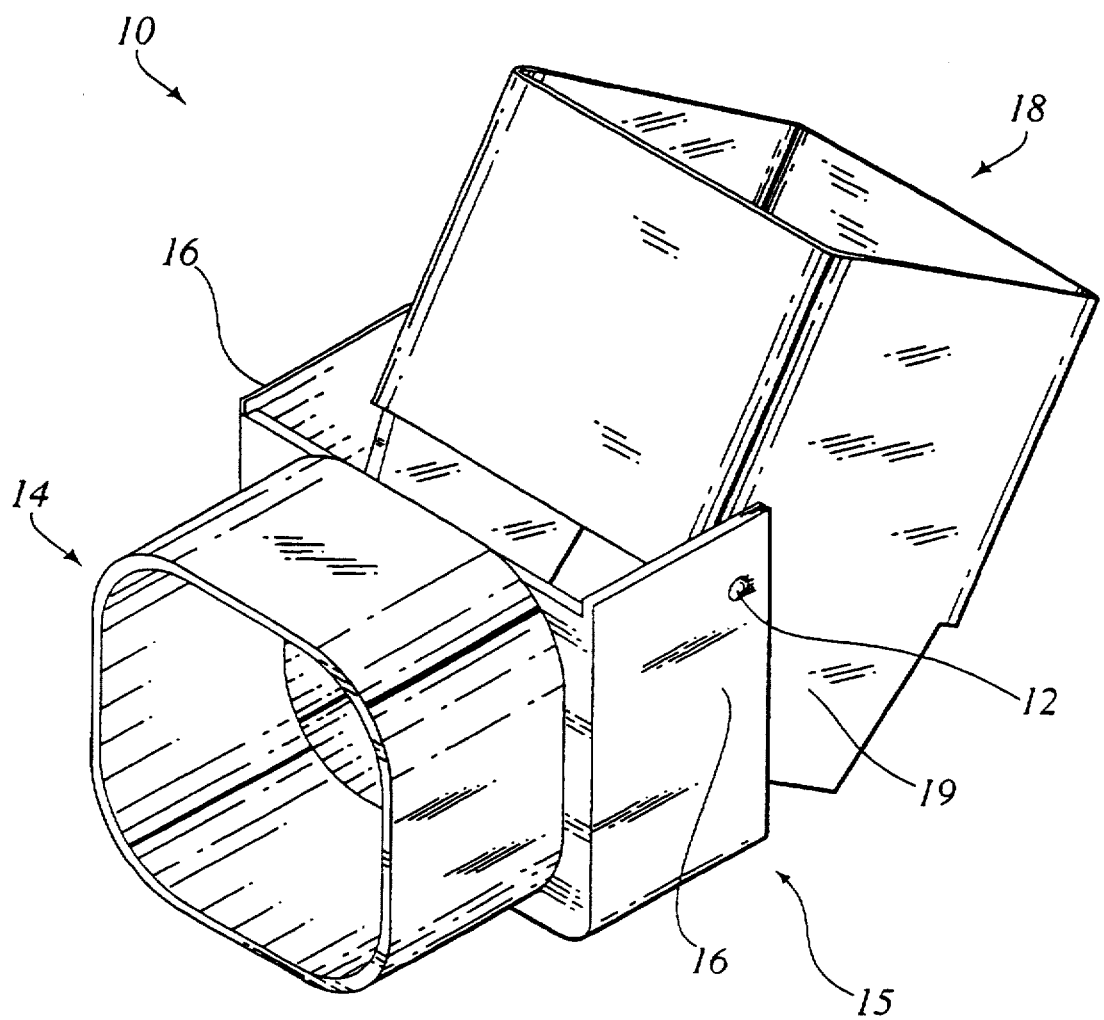
Figure 2A:
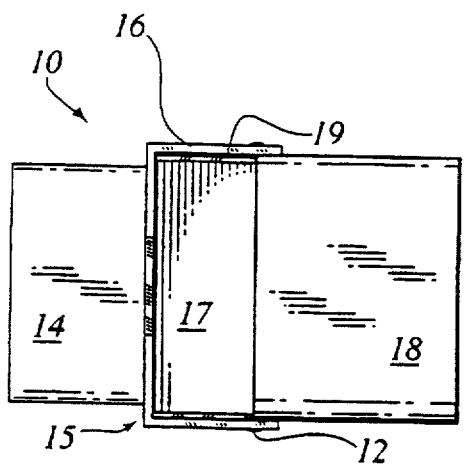
Figure 2B:
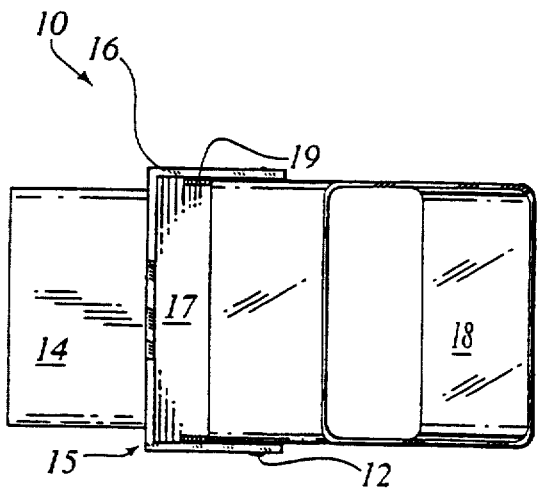
Figure 2C:
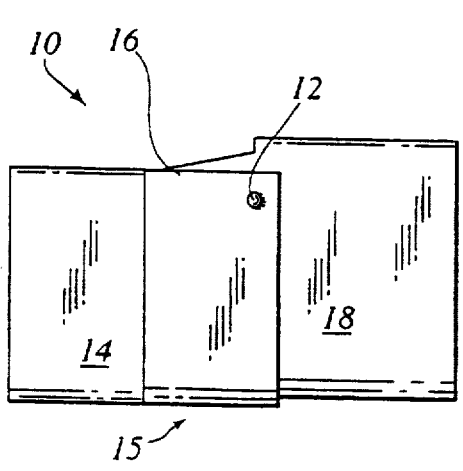
Figure 2D:
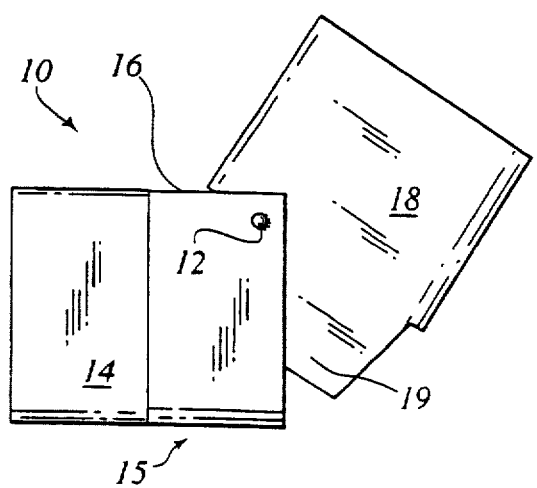
Figure 3:
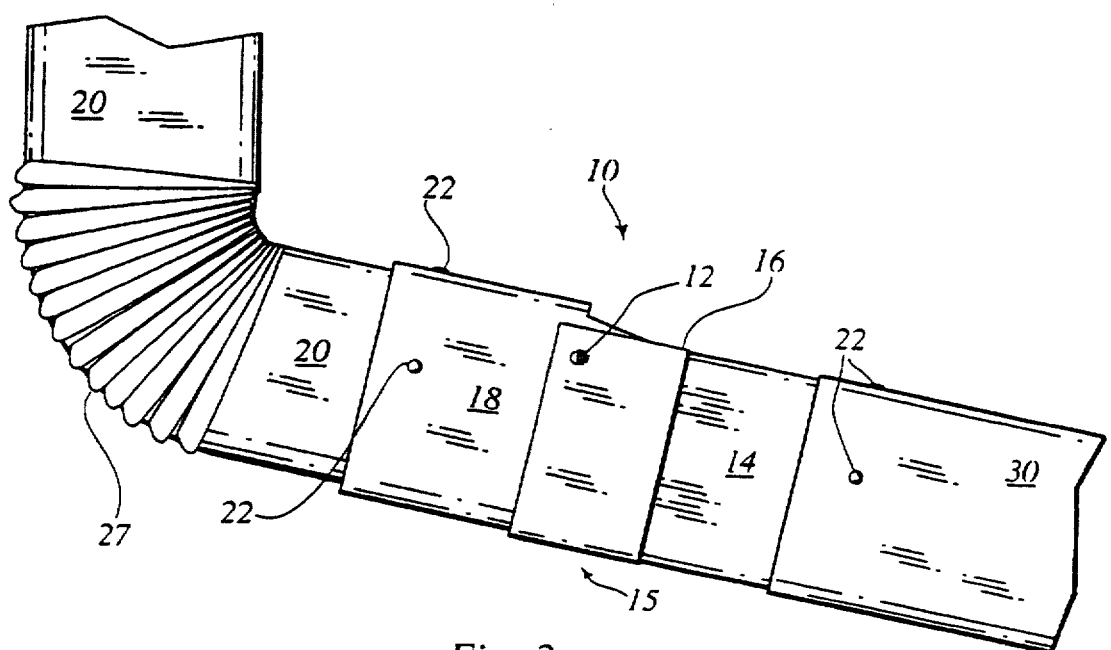
Figure 4A:
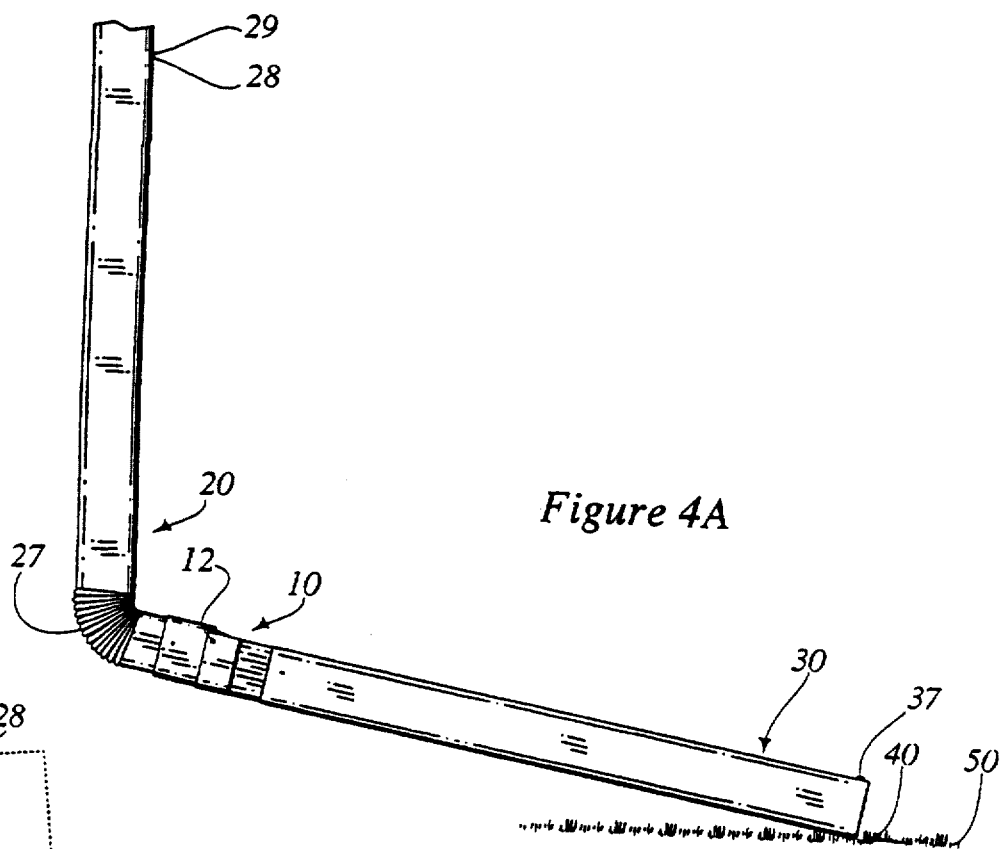
Figure 4B:
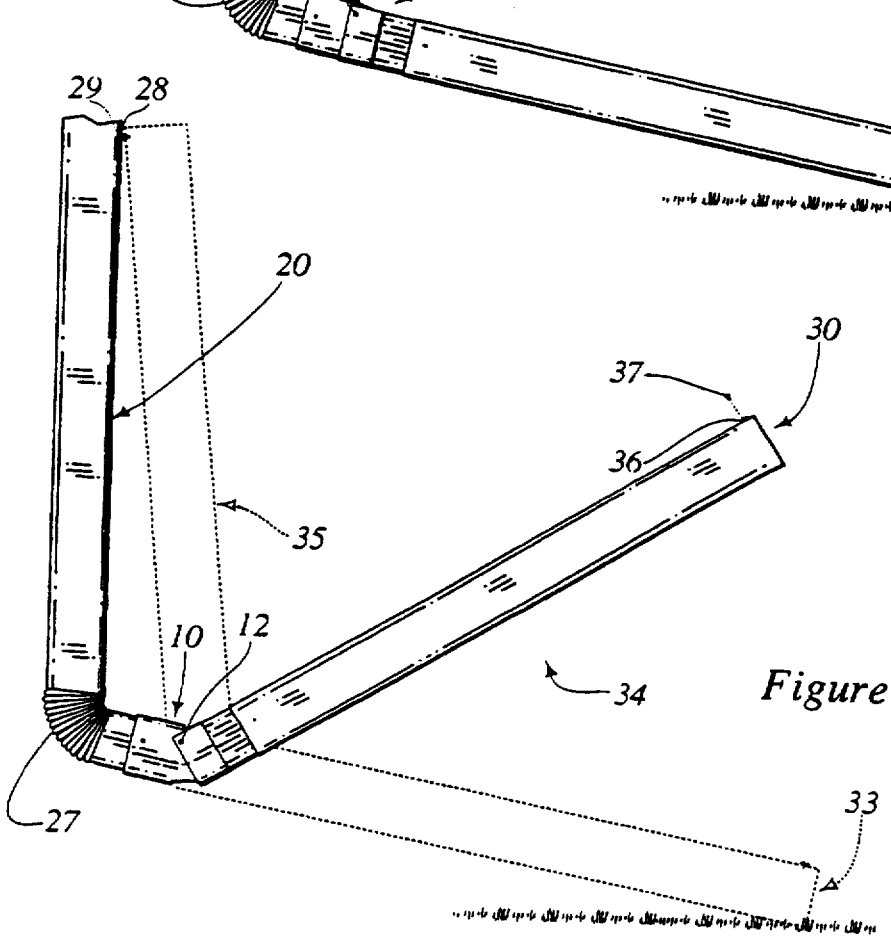
Figure 5A:
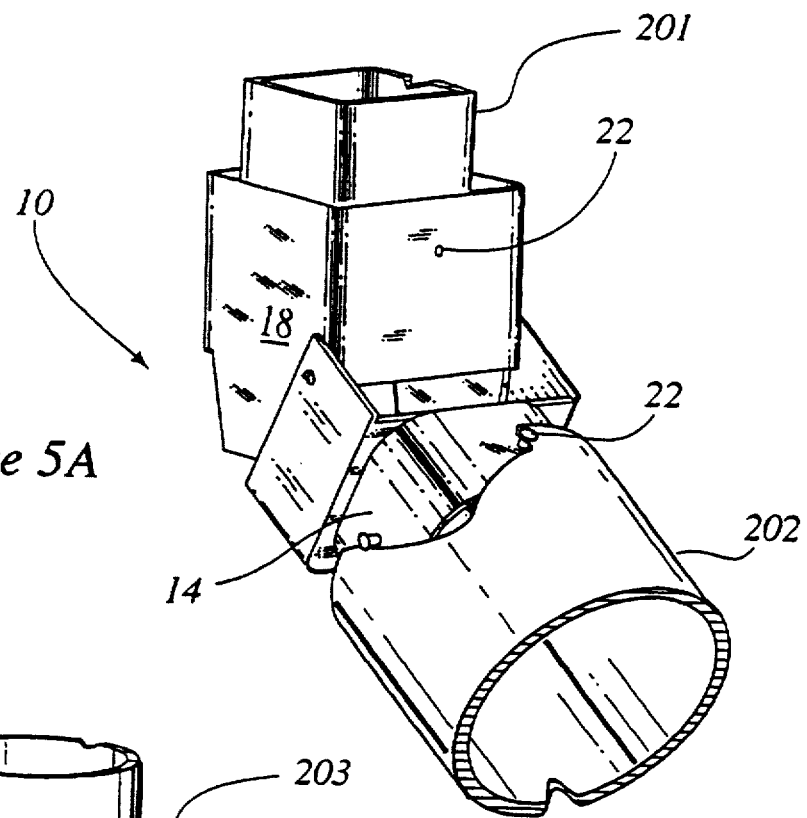
Figure 5B:
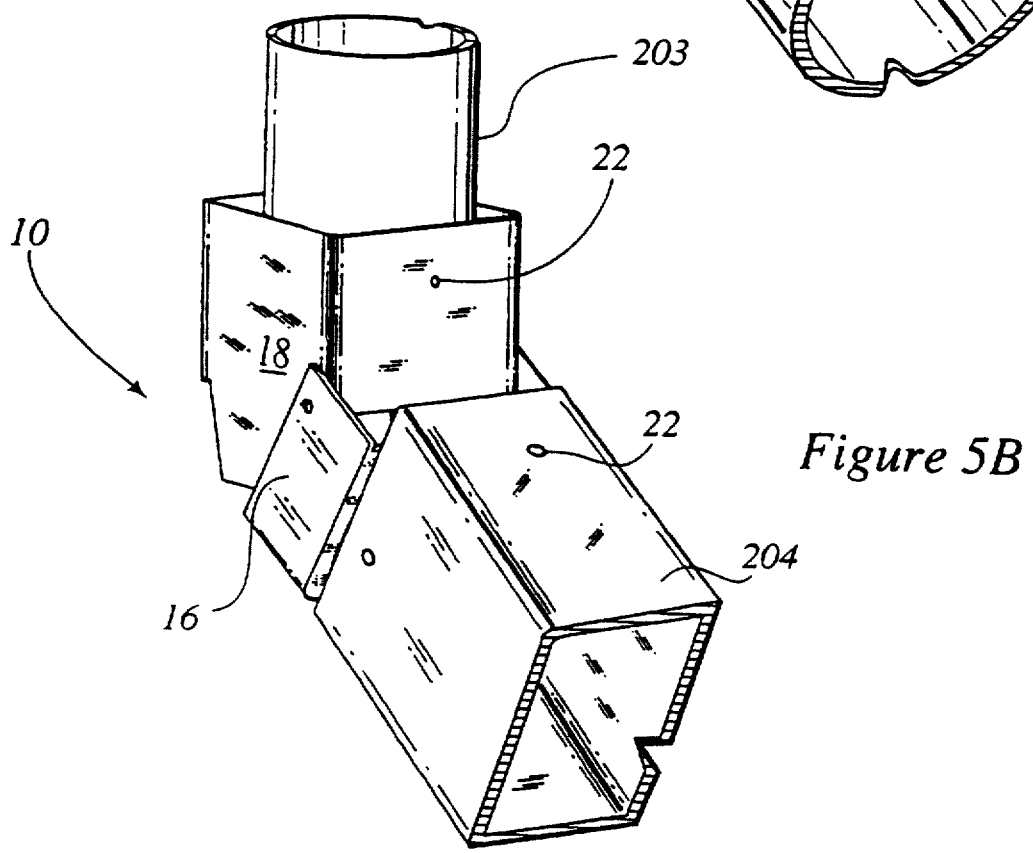

For this description, refer to the following diagrams, wherein like numerals refer to like parts:

FIG. 1, the invented hinged connector, perspective view;

FIG. 2A, the invented hinged connector, plan view;

FIG. 2B, the invented hinged connector in partially pivoted position, plan view;

FIG. 2C, the invented hinged connector, side elevation view;

FIG. 2D, the invented hinged connector in partially pivoted position, side elevation;

FIG. 3, the invented hinged connector in usage position with downspout and extension, side elevation view;

FIG. 4A, the invented hinged connector in usage position with downspout and extension, showing water flow and Velcro TM fastening, side elevation view;

FIG. 4B, variation of view 4-A, showing elevated drainage extension and Velcro TM fastening, side elevation view;

FIG. 5A, invented hinged connector showing square downspout and round drainage extension in ghost lines, perspective view; and FIG. 5B, invented hinged connector showing round downspout and rectangular drainage extension in ghost lines, perspective view.

The preferred embodiment of the invented hinged connector 10 can be seen on perspective FIG. 1 and top plan and side elevations FIGS. 2A through 2D to consist of two main sections attached by hinge pins 12; these are rounded tube indicated at 14 and squared tube indicated at 18. Rounded tube 14 has an integral projecting flange portion indicated at 15 having side-bars 16 which fit alongside and outside side-bars 19 of squared tube 18. Flange portion 15 also has a bottom 17.

Use of the invented device is as follows: in FIG. 3, eavestroughing downspout indicated at 20 is fitted inside squared tube portion 18 of hinged connector 10; three screws 22 are screwed through squared tube 18 to hold downspout 20 and hinged connector 10 firmly together, on top and both sides (only one top and one side screw are seen in FIG. 3). Similarly rounded tube portion 14 of connector 10 is fitted inside drainage extension 30, and further screws 22 are screwed through extension 30 to hold extension 30 firmly to connector 10.

In the configuration in FIG. 3, shown in expanded view FIG. 4A, water 40 flows unimpeded from downspout 20 to extension 30 and out onto grass 50.

When a situation arises in which it is required to move extension 30, this is accomplished as shown in FIG. 4B, where extension 30 has been pivoted at hinge pins 12 and moved vertically from lower ghosted position indicated at 33 to half-raised position indicated at 34. If it is desired to leave the extension 30 raised for a length of time, then it will be further raised to upper ghosted position indicated at 35, where Velcro TM

4 hook 36 held in place by screw 37 on extension 30, as seen numbered at half-raised position on diagram 4B, will mate with Velcro TM loop 28 held in place by screw 29 on downspout 20.

In FIGS. 5A and 5B, further examples are shown of different cross-sections of downspouts and extensions which may be connected to connector 10; in FIG. 5A, 2 ⅜ inch by 2 ⅜ inch downspout 201, shown dotted, is fitted inside squared tube portion 18 of connector 10; screws 22 hold downspout 201 and connector 10 together. Three-inch round extension 202, shown dotted, is fitted overtop rounded portion 14 of connector 10, and similarly firmly affixed with further screws 22. (Note that in this example 5A, and in 5B to be described, the connector 10 is shown in a partially pivoted position and without angled elbow 27, seen on FIGS. 3 and 4/4A on downspout 20; FIGS. 5A and B are meant as illustrations of some different connections possible and not as depiction of actual installations).

In FIG. 5B similarly 3-inch rounded downspout 203 is affixed inside portion 18 of connector 10, while 2×3-inch rectangular drainage extension 204 is fitted overtop rounded portion 14 of connector 10; again screws 22 are used.

Several possible combinations are not shown diagrammatically; however it will be understood that any of the three common cross-sections described can be either the downspout or the extension, making a total of nine unique permutations. As well, it should be noted that whereas a particular hinged connector 10, such as that shown in FIGS. 1 through 5, is designed to accommodate particular common cross sections of pipe, such as hinged connector 10 will also be fittable by other close sizes and shapes of downspout and drainage extension pipe, with small amounts of adaptation, since such pipe commonly is made of thin metal or plastic that can be easily bent or formed at such a join. Thus many downspouts and extensions can be fitted to this universal hinged connector.

The foregoing is by example only, and the scope of the invention should be limited only by the appended claims.

The embodiments of the Invention in which an exclusive property or privilege is claimed are defined as follows:

1. A device for downspout pipes with cross sections chosen from the group containing: three-inch diameter round; 2-⅜"×2-⅜" square; 2-⅜"×2-⅜" square with rounded corners; 2"×3" rectangular; 2"×3" rectangular with rounded corners; to be connected extension pipes with cross sections chosen from the same group; and further for allowing the end of the extension away from said connection to be pivoted vertically and separably fastened to the downspout; said device comprising:
(a) a hinged connector, comprising:
  (i) a first portion of connector pipe having an approximately square cross section; said cross section being slightly larger than the downspout cross section chosen from said group, or, where more than one size or shape of said downspout cross section is in use, larger than at least one of such selected sizes or shapes, so that several sizes or shapes of said downspouts may fit inside said first portion;
  (ii) a second portion of connector pipe having the cross section of a square with rounded corners; said cross section being slightly smaller than at least one of the drainage extension cross section chosen from said group, or, where more than one size or shape of said extension standard cross section is in use, smaller than at least one of such selected sizes or shapes, so that said second portion may fit inside several sizes or shapes of said drainage extensions;

(iii) flanges extending from the first portions, mating with flanges extending from the second portion, such that when the two said portions are oriented longitudinally and said flanges are mated, water will flow through said two portions without escaping between them;

(iv) pivot pins through said flanges at right angles to the longitudinal axis of said two portions of pipe, allowing said two portions to hinge relative to one another so that if one of said portions remains horizontal, the other will pivot vertically;

(v) screw means for fixing said first portion to said downspout when a downspout of cross section smaller than said first portion is fitted inside said first portion, said screw means being screwed through the first portion and the downspout from the exterior surface of the first portion; or if an extension pope of cross section larger than said second portion is fitted outside said second portion, it may similarly be firmly affixed there with more of said screw means; and (b) Velcro TM loop or hook material affixed to the end of the extension away from the connector; and mating Velcro TM material affixed to the downspout at an appropriate height so that when the extension pipe is pivoted upwards it may be separably affixed to the downspout;

whereby a person may fasten one end of the hinged connector to the downspout using friction fit and screws; and fasten the other end of the hinged connector to the drainage extension using friction fit and screws; so that water flows from the downspout through the adaptor and into the drainage extension; and whereby a person may, when connecting different sizes or shapes of downspout or extension, reverse the adaptor to achieve a better fit between the hinged connector and either the downspout or extension or both; and wherein it may be convenient, in order to achieve such better fit, to bend the material of the downspout or extension.

* * * * *

UNITED STATES PATENT AND TRADEMARK OFFICE
CERTIFICATE OF CORRECTION

PATENT NO. :   5,375,891
DATED      :   December 27, 1994
INVENTOR(S) :  Sicotte et al.

It is certified that error appears in the above-identified patent and that said Letters Patent is hereby corrected as shown below:

Claim 1, Column 5, line 3:   delete "standard".

Claim 1, Column 6, line 1:   "pope" should be --pipe--.

Signed and Sealed this

Fourteenth Day of March, 1995

Attest:

BRUCE LEHMAN

*Attesting Officer*         *Commissioner of Patents and Trademarks*